(12) United States Patent
Bristol et al.

(10) Patent No.: US 10,061,458 B1
(45) Date of Patent: Aug. 28, 2018

(54) HAND-HELD CONTROLLER USING CAPACITIVE TOUCH PAD

(71) Applicant: Oculus VR, LLC, Menlo Park, CA (US)

(72) Inventors: Peter Wesley Bristol, Seattle, WA (US); Yi-Yaun Chen, Seattle, WA (US); Glen Jason Tompkins, Woodinville, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/493,062

(22) Filed: Apr. 20, 2017

(51) Int. Cl.
*G06F 3/044* (2006.01)
*G06F 3/0354* (2013.01)
*G06F 3/01* (2006.01)
*G06T 19/00* (2011.01)

(52) U.S. Cl.
CPC ............. *G06F 3/044* (2013.01); *G06F 3/016* (2013.01); *G06F 3/03547* (2013.01); *G06T 19/006* (2013.01)

(58) Field of Classification Search
CPC ...... G06F 3/044; G06F 3/03547; G06F 3/016; G06T 19/006
See application file for complete search history.

(56) References Cited

U.S. PATENT DOCUMENTS

| | | |
|---|---|---|
| 5,764,164 A | 6/1998 | Cartabiano et al. |
| 6,572,108 B1 | 6/2003 | Bristow |
| 8,570,273 B1 | 10/2013 | Smith |
| 2002/0171625 A1 | 11/2002 | Rothchild |
| 2005/0197205 A1 | 9/2005 | Hale, Jr. |
| 2008/0042995 A1 | 2/2008 | Li et al. |
| 2011/0037695 A1 | 2/2011 | Bor et al. |
| 2013/0324254 A1* | 12/2013 | Huang .................... G06F 3/016 463/37 |
| 2015/0065090 A1 | 3/2015 | Yeh |
| 2015/0100204 A1 | 4/2015 | Gondo |
| 2016/0306422 A1 | 10/2016 | Parham et al. |
| 2016/0357261 A1 | 12/2016 | Bristol et al. |
| 2016/0363996 A1* | 12/2016 | Higgins ................. G06F 3/014 |

(Continued)

FOREIGN PATENT DOCUMENTS

| | | |
|---|---|---|
| WO | WO 2015/153690 A1 | 10/2015 |
| WO | WO 2016/140924 A1 | 9/2016 |

OTHER PUBLICATIONS

PCT International Search Report and Written Opinion, PCT Application No. PCT/US2017/031974, dated Jan. 2, 2018, 16 pages.

(Continued)

*Primary Examiner* — Andrew Sasinowski
(74) *Attorney, Agent, or Firm* — Fenwick & West LLP

(57) ABSTRACT

A hand-held controller includes a handle extending in a longitudinal direction. The handle is shaped and dimensioned to be grasped by a user's hand. A ring is attached to an end of the handle and has an annular surface. The annular surface defines a plane that forms a predetermined angle with respect to the longitudinal direction. A capacitive touch pad is attached to the end of the handle and has a touch surface to receive haptic input from a finger of the user's hand. The capacitive touch pad generates sensor signals responsive to receiving the haptic input from the finger of the user's hand.

9 Claims, 4 Drawing Sheets

(56) References Cited

U.S. PATENT DOCUMENTS

2016/0364910 A1  12/2016  Higgins et al.

OTHER PUBLICATIONS

PCT International Search Report and Written Opinion, PCT Application No. PCT/US2017/037638, dated Nov. 27, 2017, 12 pages.
European Extended Search Report, European Application No. 17195995.0, dated Dec. 22, 2017, 7 pages.
PCT International Search Report and Written Opinion, PCT Application No. PCT/US2017/037608, dated Jan. 25, 2018, 15 pages.
European Extended Search Report, European Application No. 17202772.4, dated Jan. 26, 2018, 7 pages.
European Extended Search Report, European Application No. 17202777.3, dated Mar. 15, 2018, 8 pages.

* cited by examiner

HAND-HELD CONTROLLER USING CAPACITIVE TOUCH PAD

BACKGROUND

Field of the Disclosure

The present disclosure generally relates to virtual reality (VR) controllers, and specifically to a hand-held controller using a capacitive touch pad.

Description of the Related Arts

VR systems may include a controller to translate movement of the user's body into tangible action in a virtual world. Some controllers provide vibration feedback to Android or iOS VR headsets for motion-based gaming. A controller may be equipped with a gyroscope, an accelerometer, or terrestrial magnetic field sensor to trace motion back to a game, allowing intuitive gameplay as if the player is within the game.

SUMMARY

Embodiments relate to a hand-held controller to track a user's hand motion, position, natural gestures, and finger movement to create a sense of hand presence for more realistic and tactile VR. The controller may let the user make social gestures like point, wave, and give a thumbs-up or manipulate objects in the virtual space, pick up toys or fire laser guns with intuitive, natural hand movement.

In one embodiment, the hand-held controller includes a handle extending in a longitudinal direction. The handle is shaped and dimensioned to be grasped by a user's hand. A ring is attached to an end of the handle and has an annular surface. The annular surface defines a plane that forms a predetermined angle with respect to the longitudinal direction. A capacitive touch pad is attached to the end of the handle and has a touch surface to receive haptic input from a finger of the user's hand. The capacitive touch pad generates sensor signals responsive to receiving the haptic input from the finger of the user's hand.

In one embodiment, the touch surface has a circular or elliptical shape.

In one embodiment, the haptic input comprises the finger of the user's hand touching the touch surface.

In one embodiment, the haptic input comprises the finger of the user's hand moving across the touch surface.

In one embodiment, the ring surrounds a portion of the capacitive touch pad.

In one embodiment, the handle has a cylindrical shape.

In one embodiment, the capacitive touch pad is made of glass or plastic.

In one embodiment, the handle is made of engineering plastic.

In one embodiment, the touch surface is flat and forms an angle between 15° and 45° with respect to the longitudinal direction.

In one embodiment, the hand-held controller includes a wireless communication interface configured to transmit wireless signals representing the haptic input received from the capacitive touch pad.

BRIEF DESCRIPTION OF THE DRAWINGS

The teachings of the embodiments can be readily understood by considering the following detailed description in conjunction with the accompanying drawings.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to a hand-held controller that has a capacitive touch surface to track a user's finger motion. The hand-held controller includes a handle extending in a longitudinal direction. A ring is attached to an end of the handle and has an annular surface. A capacitive touch pad is attached to the end of the handle and has a touch surface to receive haptic input from a finger of the user's hand. The track surface may be used to track a position or orientation of the user in a VR environment.

Example Schematic Perspective View of Hand-Held Controller

Figure 1:
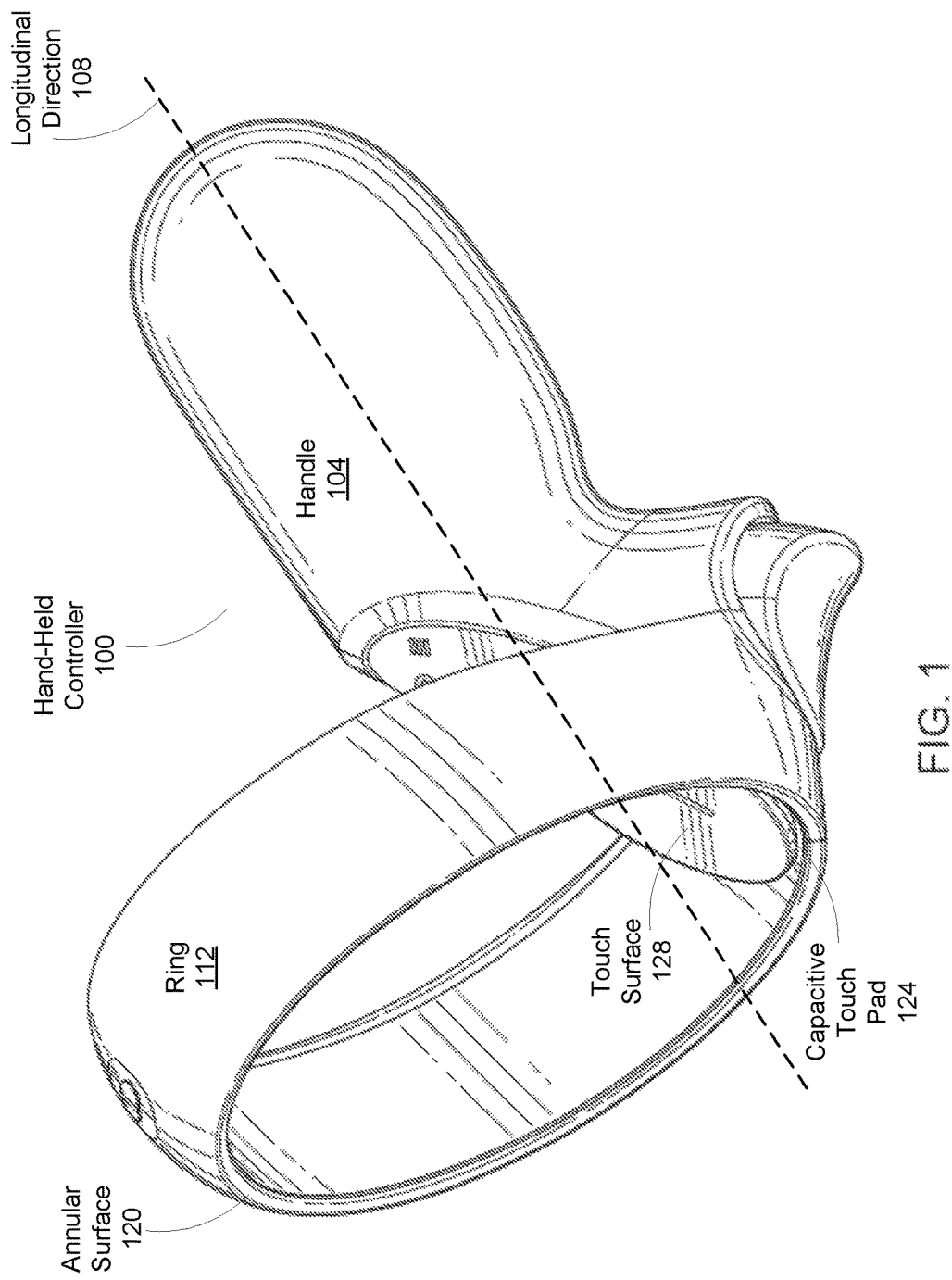
FIG. 1 is an example schematic perspective view of a hand-held controller, in accordance with an embodiment.

FIG. 1 is an example schematic perspective view of a hand-held controller 100, in accordance with an embodiment. The hand-held controller 100 may part of a VR system as a stand-alone controller or as part of a pair of tracked controllers that give a user "hand presence"—the feeling that the user's virtual hands are actually his own. The hand-held controller 100 may enable the user to manipulate objects in a virtual space with precision and intuitive, natural hand movement.

The hand-held controller 100 includes a handle 104 extending in a longitudinal direction 108. The handle 104 may be made of an engineering plastic, such as acrylonitrile butadiene styrene (ABS), polycarbonate, or polyamide (nylon). In embodiments, the handle 104 may be made of wood or metal. The handle 104 may be resistant to impact and abrasion. The material of the handle 104 may exhibit heat resistance, mechanical strength, or rigidity.

The handle 104 is shaped and dimensioned to be grasped by a user's hand for tracking natural gestures and finger movements to create more realistic and tactile VR. For example, the handle may have a cylindrical shape. The handle 104 of the hand-held controller 100 may bend or curve to balance the weight of the controller 100, such that it rests naturally in the top of the palm of the user or the crook of the user's fingers. The user may therefore comfortably hold the hand-held controller 100 without dropping it. Even if the user tries to open his hand completely when holding the hand-held controller 100 normally, the user's fingers may catch on the ring 112 and support the hand-held controller 100's weight. The ring 112 is attached to an end of the handle 104 and has an annular surface 120. The ring may be made of engineering plastic.

A capacitive touch pad 124 is attached to the end of the handle 104. The ring 112 surrounds a portion of the capacitive touch pad 124. The capacitive touch pad 124 has a touch surface 128 to receive haptic input from a finger of the user's hand. The capacitive touch pad 124 may have a tactile sensor to translate the motion and position of a user's fingers on the touch surface 128 to a relative position in a VR environment that is output to a computer screen or a head-mounted display (HMD). The capacitive touch pad 124 may operate by capacitive sensing, such as by sensing the capacitive virtual ground effect of the user's finger.

The capacitive touch pad 124 may be made of glass, a glass-like polymer, plastic, or metal. In an embodiment, the capacitive touch pad 124 may be made of a flexible hydrogel embedded in silicone rubber.

Figure 2:
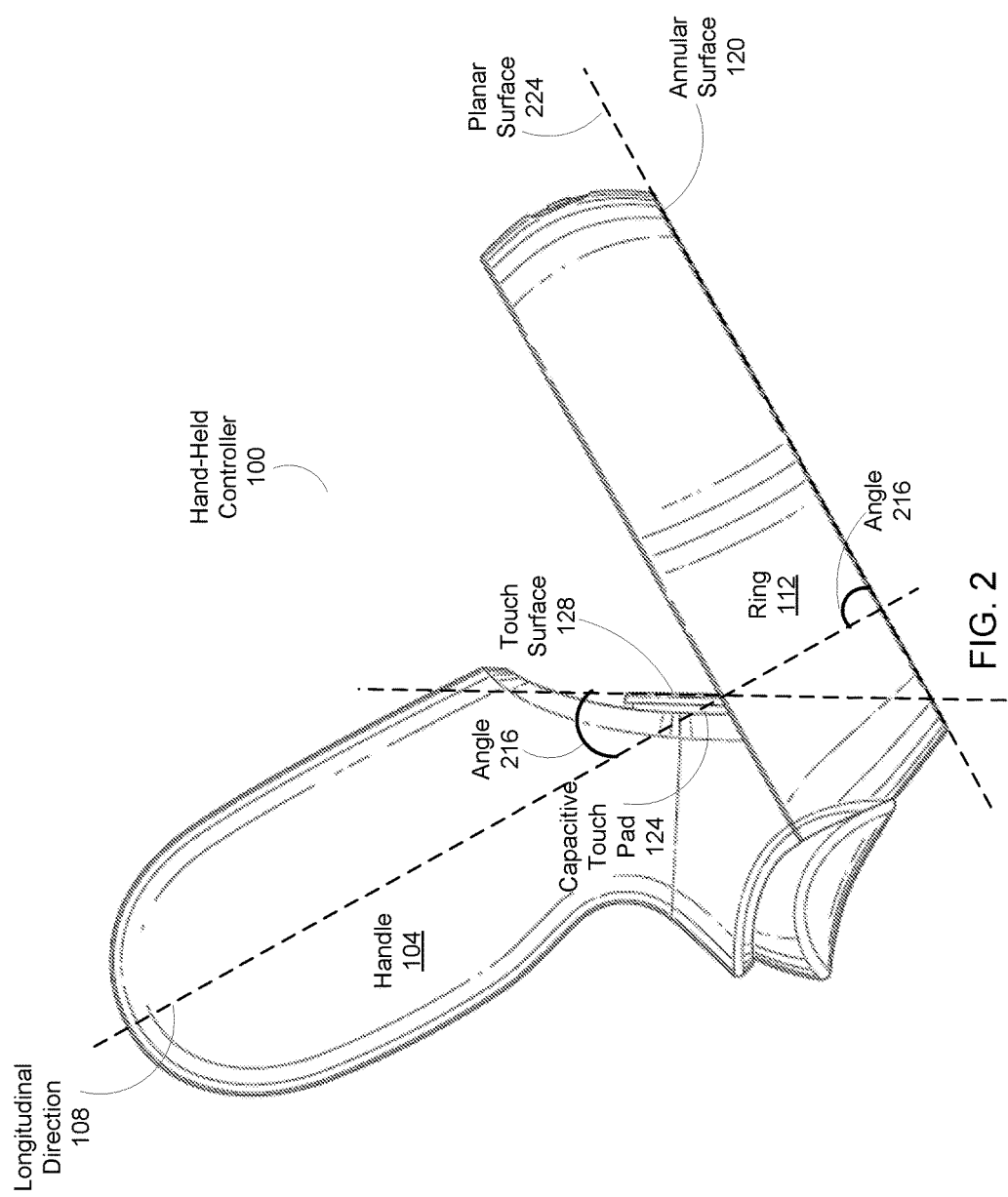
FIG. 2 is an example schematic side view of the hand-held controller, in accordance with an embodiment.

FIG. 2 is an example schematic side view of the hand-held controller 100, in accordance with an embodiment. The annular surface 120 of the ring 112, illustrated and described above with reference to FIG. 1, defines a plane 224 that forms a predetermined angle 216 with respect to the longitudinal direction 108 in which the handle 104 extends. The predetermined angle 216 may be between 45° to 135°. The touch surface 128 of the capacitive touch pad 124, illustrated and described above with reference to FIG. 1, may be flat and form an angle between 15° and 45° with respect to the longitudinal direction 108, as illustrated in FIG. 2.

Figure 3:
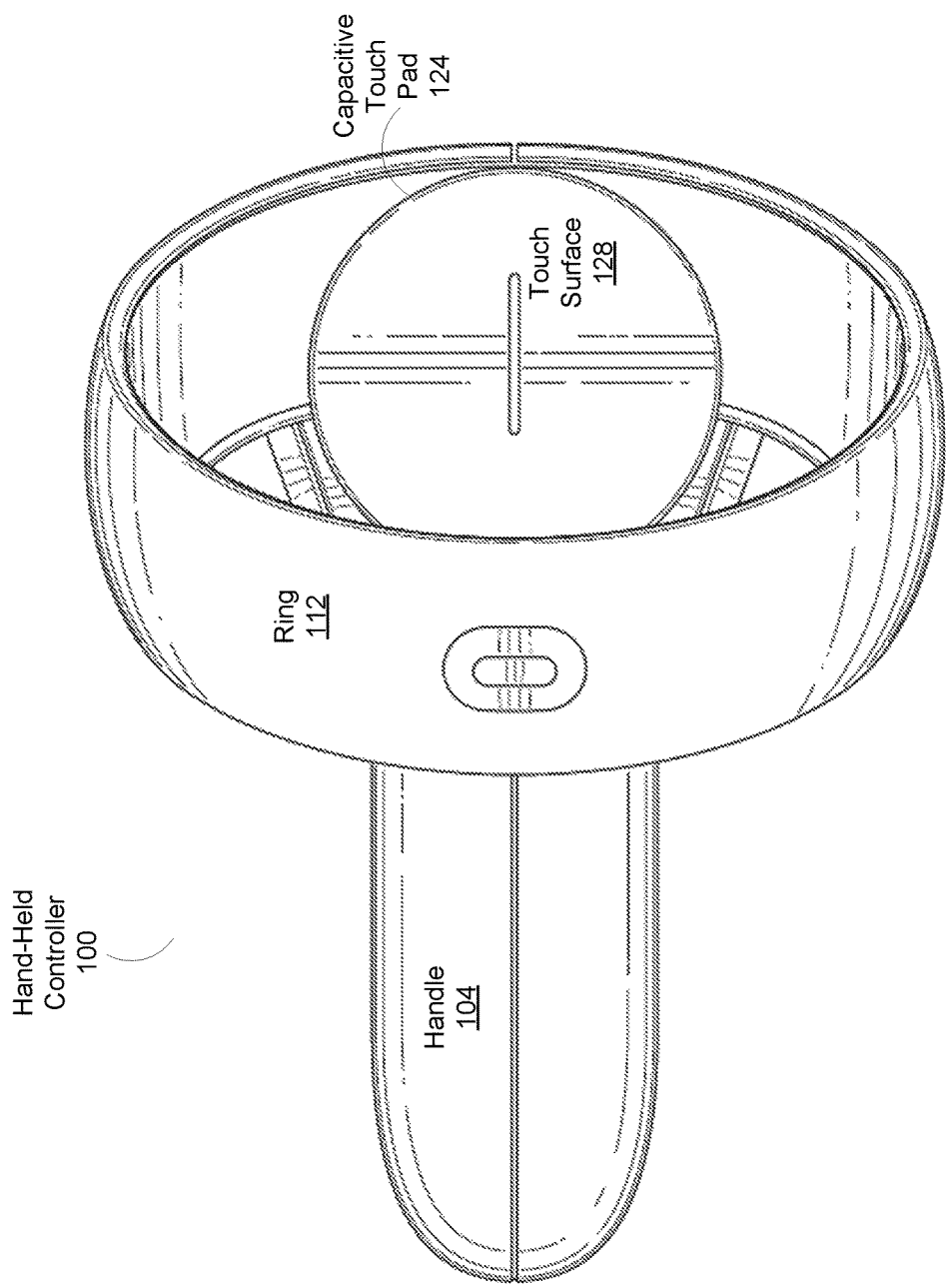
FIG. 3 is an example schematic planar view of the hand-held controller, in accordance with an embodiment.

FIG. 3 is an example schematic planar view of the hand-held controller 100, in accordance with an embodiment. The touch surface 128 of the capacitive touch pad 124 may have a circular or elliptical shape, as illustrated in FIG. 3. The haptic input sensed by the touch surface 128 of the capacitive touch pad 124 may include the finger of the user's hand touching the touch surface 128. The haptic input sensed by the touch surface 128 of the capacitive touch pad 124 may include the finger of the user's hand moving across the touch surface 128.

In an embodiment, the capacitive touch pad 124 may be a multi-touch pad, meaning that the user may use two or more fingers to activate gesture-based commands via the capacitive touch pad 124. The capacitive touch pad 124 and its associated device driver software may interpret tapping the touch surface as a "click." A tap on the touch surface 128 followed by a continuous pointing motion may indicate dragging.

The capacitive touch pad 124 may have "hotspots," that are locations on the touch surface 128 used for advanced functionality. For example, moving the user's finger along an edge of the touch surface 128 may act as a scroll wheel. The capacitive touch pad 124 may also support two-finger dragging for scrolling. The capacitive touch pad 124's driver may support tap zones—regions where a tap will execute a function, for example, pausing a VR game or launching an application.

Figure 4:
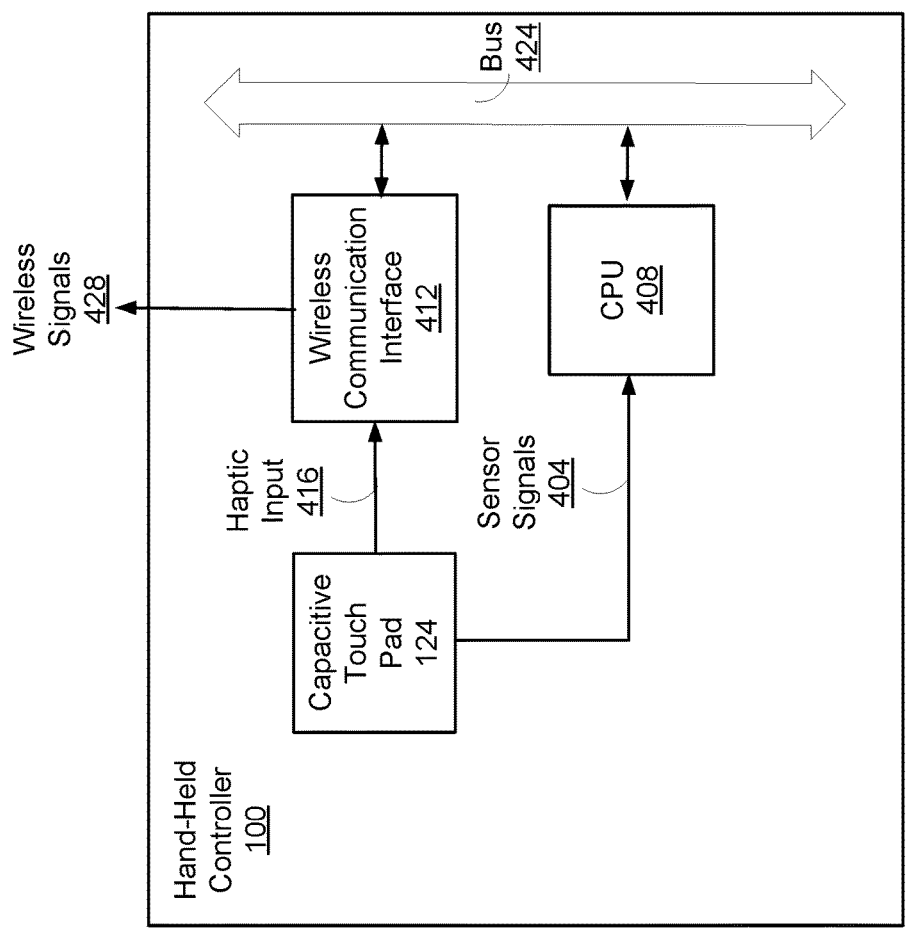
FIG. 4 is an example schematic block diagram of the hand-held controller, in accordance with an embodiment.

FIG. 4 is an example schematic block diagram of the hand-held controller 100, in accordance with an embodiment. The hand-held controller 100 includes the capacitive touch pad 124, a wireless communication interface 412, a central processing unit 408, and a bus 324. In alternative configurations, different and/or additional components may be included in the hand-held controller 100, such as a memory, battery, Bluetooth component, USB input, etc.

The capacitive touch pad 124 generates sensor signals 404 responsive to receiving the haptic input from the finger of the user's hand. The capacitive touch pad 124 may generate the sensor signals 404 by detecting the electrical current of the user's finger as it comes into contact with the touch surface 128. In one embodiment, the sensor signals 404 may be sent to the central processing unit 408 from the capacitive touch pad 124.

The hand-held controller 100 may include a wireless communication interface 412, which may be a digital, analog, or mixed-signal circuit to transmit wireless signals 428 indicating haptic input 416 received from the capacitive touch pad 124. The wireless communication interface 412 may send and receive data via a wireless network without the need for connecting cables to the hand-held controller 100. In one embodiment, the wireless communication interface 412 may support the USB 1.1 and 802.11b wireless network standards up to 11 Mbps data transfer rates. In one embodiment, the wireless communication interface 412 may support the USB 2.0 and 802.11g standards up to 54 Mpbs data transfer rates. In one embodiment, the wireless communication interface 412 may be a Compact Flash (CF) wireless network adapter use infrared technology for data exchanges between the hand-held controller 100 and a computer, etc. The wireless signals 428 may be transmitted to a head-mounted display, a computer, a VR system, etc. The wireless communication interface 412 and the central processing unit 408 may communicate via the bus 424.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A hand-held controller comprising:
   a handle extending in a longitudinal direction, the handle shaped and dimensioned to be grasped by a user's hand;
   a ring attached to an end of the handle and having an annular surface, the annular surface defining a plane that forms a predetermined angle with respect to the longitudinal direction; and
   a capacitive touch pad attached to the end of the handle and having a touch surface to receive haptic input from a finger of the user's hand, the capacitive touch pad configured to generate sensor signals responsive to receiving the haptic input from the finger of the user's hand, wherein the ring surrounds at least a portion of the capacitive touch pad.

2. The hand-held controller of claim 1, wherein the touch surface has a circular or elliptical shape.

3. The hand-held controller of claim 1, wherein the haptic input comprises the finger of the user's hand touching the touch surface.

4. The hand-held controller of claim 1, wherein the haptic input comprises the finger of the user's hand moving across the touch surface.

5. The hand-held controller of claim 1, wherein the handle has a cylindrical shape.

6. The hand-held controller of claim 1, wherein the capacitive touch pad is made of glass, plastic, or metal.

7. The hand-held controller of claim 1, wherein the handle is made of engineering plastic.

8. The hand-held controller of claim 1, wherein the touch surface is flat and forms an angle between 15° and 45° with respect to the longitudinal direction.

9. The hand-held controller of claim 1, further comprising a wireless communication interface configured to transmit wireless signals representing the haptic input received from the capacitive touch pad.

* * * * *